Figure 1:
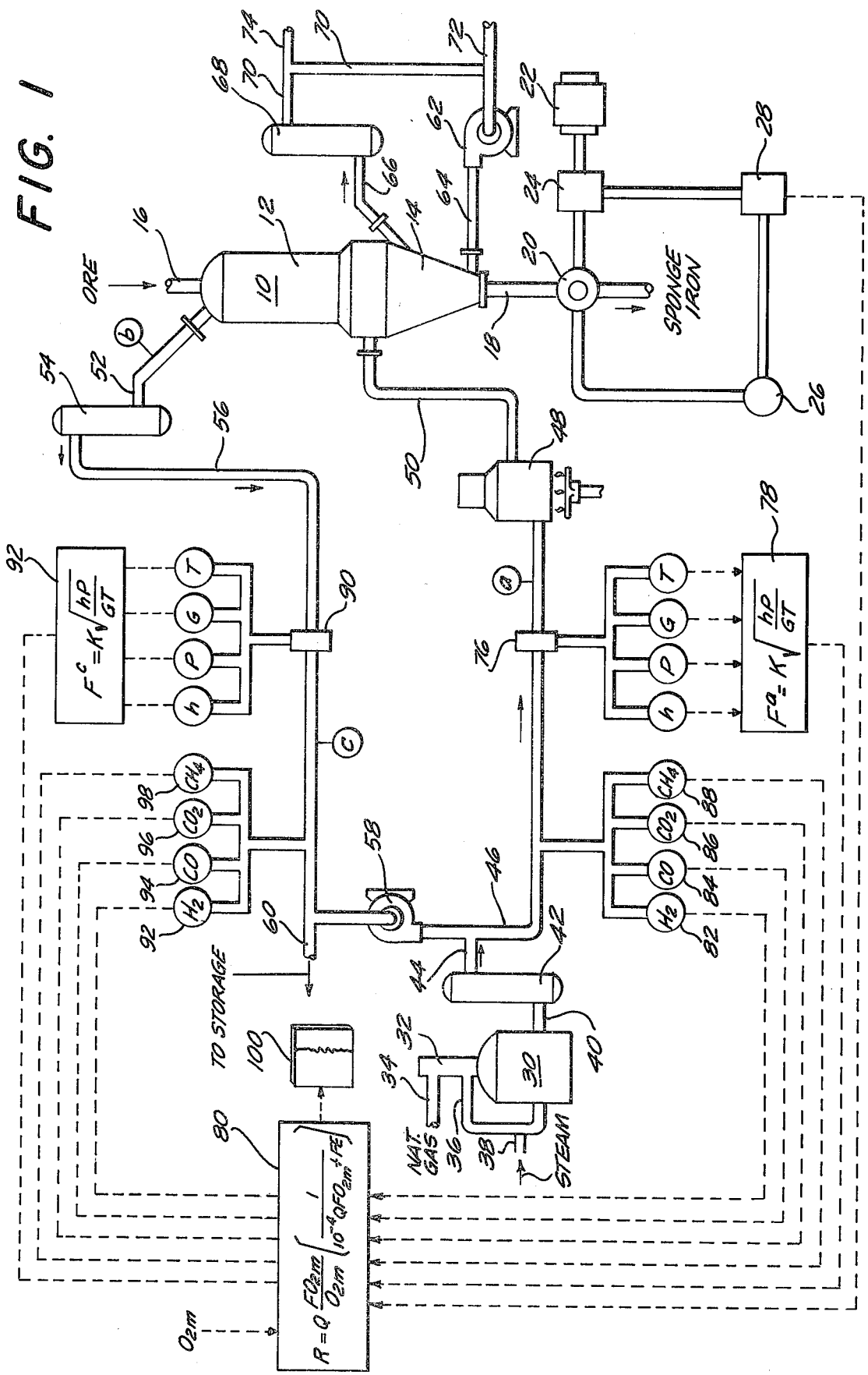

United States Patent [19]

MacKay et al.

[11] 4,099,962

[45] Jul. 11, 1978

[54] METHOD AND APPARATUS FOR MEASURING AND CONTROLLING THE PERCENTAGE REDUCTION OF ORE IN A MOVING BED GASEOUS REDUCTION REACTOR

[75] Inventors: Patrick W. MacKay; Enrique Martinez Vera; Ramon de la Pena, all of Monterrey, Mexico

[73] Assignee: Grupo Industrial Alfa, S.A., Monterrey, Mexico

[21] Appl. No.: 646,496

[22] Filed: Jan. 5, 1976

[51] Int. Cl.$^2$ .............................................. C22B 1/10
[52] U.S. Cl. ............................................. 75/26; 75/35
[58] Field of Search ............................... 75/26, 34, 35

[56] References Cited

U.S. PATENT DOCUMENTS

| | | | |
|---|---|---|---|
| 3,119,669 | 1/1964 | Laird | 23/232 |
| 3,157,488 | 11/1964 | Taylor | 75/34 |
| 3,288,590 | 11/1966 | Keith | 75/26 |
| 3,304,170 | 2/1967 | Hinsvark | 75/34 |
| 3,369,888 | 2/1968 | Cruse | 75/34 |
| 3,486,861 | 12/1969 | Wiseman | 23/232 |
| 3,522,035 | 7/1970 | Putman | 75/60 |
| 3,765,872 | 10/1973 | Celada | 75/34 |
| 3,770,421 | 11/1973 | Celada | 75/34 |
| 3,779,741 | 12/1973 | Celada | 75/35 |
| 3,816,102 | 6/1974 | Celada | 75/35 |
| 3,827,879 | 8/1974 | Celada | 75/35 |

Primary Examiner—P. D. Rosenberg
Attorney, Agent, or Firm—Curtis, Morris & Safford

[57] ABSTRACT

A method and apparatus for measuring and controlling the percentage reduction of iron ore in a vertical shaft, moving bed, gaseous reduction reactor. Reducing gas comprising hydrogen, methane, carbon monoxide and carbon dioxide is fed from a source of such gas to the bottom of the reduction zone of the reactor and is heated to an elevated temperature before being introduced into the reactor. The flow and composition of the reducing gas are determined at a first location before the gas enters the reactor. The effluent gas from the reactor is cooled and its flow and composition determined at a second location after the gas has been cooled. The measured flows and compositions are correlated with the rate of sponge iron production to obtain a measurement of percentage reduction of the ore and this measurement is used, either manually or automatically, to regulate the rate of removal of sponge iron from the reactor to maintain the percentage reduction at a predetermined desired value.

9 Claims, 2 Drawing Figures

METHOD AND APPARATUS FOR MEASURING AND CONTROLLING THE PERCENTAGE REDUCTION OF ORE IN A MOVING BED GASEOUS REDUCTION REACTOR

This invention relates to the gaseous reduction of oxidic ores in a vertical shaft, moving bed reactor to form sponge metal and more particularly to a novel method and apparatus for measuring and maintaining at a predetermined desired value the percentage reduction of the sponge metal produced in such a reactor. The invention will be illustratively described in connection with the reduction of iron ore to produce sponge iron, although as the description proceeds it will become apparent that the invention can equally well be used in the reduction of other oxidic ores, e.g., those of nickel, copper and tin.

Typical gaseous reduction systems in which the present invention may be usefully employed are disclosed in U.S. Pat. Nos. 3,765,872; 3,770,421; 3,779,741; and 3,816,102. Such systems commonly comprise a catalytic reformer for generating a reducing gas largely composed of carbon monoxide and hydrogen and a vertical shaft reactor having a reducing zone in the upper portion thereof and a cooling zone in the lower portion thereof. The ore to be reduced is fed to the top of the reactor and flows downwardly therethrough, first through the reducing zone wherein it is brought into contact with heated reducing gas from the reformer and then through a cooling zone wherein it is cooled by a gaseous coolant before being removed at the bottom of the reactor. Effluent gas from the reducing zone is cooled to remove water therefrom, and in most cases, a major part of the cooled effluent gas is re-heated and recycled to the reducing zone. Similarly at least a part of the coolant gas from the cooling zone is commonly cooled and recycled to the cooling zone. At its lower end the reactor is provided with some means for controlling the discharge of the cooled sponge iron from the reactor, e.g., a rotary discharge valve, vibratory chute, short conveyor belt or the like.

Generally it is desirable that the reactor be so operated as to produce sponge iron having a uniform degree of reduction. The principal operating variables affecting percentage reduction of the iron ore are the residence time of the ore within the reactor and the composition, flow rate and temperature of the reducing gas. The residence time in the reactor can be changed rather simply by regulating the sponge iron discharge control means, e.g., by changing the speed of rotation of a rotary discharge valve. Hence the sponge iron discharge rate is generally the preferred control variable and percentage reduction of the ore is the variable to be controlled, with the other variables being maintained substantially constant.

It is evident that percentage reduction of the iron ore can be measured directly by chemical analysis of the sponge iron after its discharge from the reactor. However, when percentage reduction is determined on a sample of the discharged sponge iron, an unacceptable time delay occurs before a corrective change can be made based on the results of the analysis. To avoid such a time delay the percentage reduction must be determined while the sponge iron is still in the reactor.

During passage of the reducing gas through the reducing zone of the reactor the gas composition changes as an incident of the removal of oxygen from the iron ore and hence it is theoretically possible to determine the percentage reduction indirectly by measuring changes in the flow and composition of the inlet and outlet gases. However, when an effort is made to so measure percentage reduction, a number of practical problems are encountered. In the first place, the constituents of the reducing gas react with the oxygen of the iron ore by a plurality of reactions which, in general, are reversible and have temperature-dependent equilibria. Thus a rather complex series of changes occurs within the reducing zone of the reactor. While apparatus is commercially available for rapidly and continuously measuring most of the constituents of the reducing gas, i.e., carbon monoxide, hydrogen, methane and carbon dioxide, the measurement of water vapor in the reducing gas presents a problem, particularly in those systems wherein the effluent gas from the reducing zone is dewatered in a quenching tower by direct contact with cooling water.

A further problem encountered arises out of the fact that the effluent gas from the reactor contains a considerable amount of suspended dust. This dust tends to interfere with accurate measurement of the flow and composition of the gas.

Because of the difficulty of achieving accurate measurement and control of the percentage reduction or degree of metallization that occurs in such a vertical shaft reactor, the reduction zone of the reactor is often "over designed" to make sure that the desired degree of reduction is attained. Thus the reactor reduction zone is provided at the bottom thereof with a "chemical reserve" zone through which the reducing gas flows but in which little, if any, reduction occurs. This reserve zone provides a safety factor to ensure that the desired degree of reduction occurs, notwithstanding variations in the rate of through-put of iron-bearing material, reducing gas composition, temperature and other variables of the reduction process. It is evident that the provision of such an unutilized or under-utilized zone increases the cost of the reactor and that an accurate measurement technique would make this reserve zone unnecessary and thereby decrease the cost of the reactor and permit more efficient utilization of the reducing gas.

Moreover, in some cases it is desirable to produce a sponge iron having a relatively low level of reduction. This may be desirable, for example, if the cooling gas used in the lower section of the shaft reactor is a reducing gas capable of effecting a further reduction of the sponge iron. Also in some cases it is desirable to produce a sponge iron having a relatively low level of reduction in the reactor and complete the reduction in an electric furnace. When a chemical reserve zone is used in the reactor, the operator is not free to select the lower level of reduction in the sponge from leaving the reduction zone if he so desires.

In other cases an operator may reduce the operating temperature of the reduction zone in order to obtain a lower degree of reduction in the sponge iron. This, of course, is wasteful of the inherent productivity of the reactor because the reduction rate slows down and the operator cannot trade off a decreased degree of reduction for a desirably increased through-put. An accurate method of measuring the percentage reduction would provide a greater degree of operating flexibility in achieving a variety of degrees of ore reduction at optimum gas efficiency of the reducing gas.

It is accordingly an object of the present invention to provide a novel method and apparatus for measuring the percentage reduction of an oxidic ore in a vertical shaft reduction reactor. It is another object of the invention to provide a novel method and apparatus for controlling the percentage reduction of an oxidic ore in a vertical shaft reduction reactor to maintain it substantially at a desired value. It is still another object of the invention to provide a method of achieving a greater degree of operating flexibility in a vertical shaft reduction reactor in respect to the range of variation of the degree of reduction that can be efficiently achieved in the reactor. Other objects of the invention will be in part obvious and in part pointed out hereinafter.

The objects and advantages of the present invention are achieved in general by measuring the flow and composition of the reducing gas before the gas is fed to the reactor, measuring the flow and composition of the effluent reducing gas after it has been quench cooled and correlating these flow and composition measurements with the oxygen content of the ore to be reduced and the rate of production of sponge iron to determine the percentage reduction of the ore. The percentage reduction as thus determined can be used as a control variable for either manually or automatically regulating the speed of rotation of the sponge iron discharge valve or other sponge iron discharge regulator to maintain the percentage reduction at a desired value.

As indicated above, it does not appear to be practical to obtain an accurate determination of percentage reduction by using a conventional material balance because of the problems encountered in attempting to measure the flow rate and composition of the reduction zone effluent gas. The effluent gas from the reactor flows to a quench cooler wherein it is rapidly cooled and de-watered. If an attempt is made to measure the rate of flow of this effluent gas between the reactor and the cooler, it is difficult to achieve an accurate measurement because of the high temperature and dust content of the gas which interferes with the operation of the flowmeter and gas analysis devices.

If, on the other hand, a measurement is made on the cooler effluent gas, the flow rate may be readily measured, but the gas composition will differ from the composition of the reactor effluent gas by an unmeasured amount of water vapor that has been removed from the gas stream in the quench cooler and cannot readily be differentiated from the cooling water with which it is mixed. Furthermore, even if the water were accurately measured, its origin may be something other than the reduction reactions occurring in the reduction zone. For example, the water may be derived from moisture in the ore or from water of crystallization. Since the reducing gas fed to the reduction zone of the reactor is essentially dust-free, its flow rate and composition can be readily measured either before or after the gas is heated.

In accordance with a preferred embodiment of the present invention, it has been found that the problems referred to above can be circumvented by determining the flow and composition of the reactor feed gas before it is fed to the reactor, determining the flow and composition of the reactor effluent gas after it has been cooled and de-watered and using a combination of a hydrogen balance and an oxygen balance to determine the percentage reduction. As will be more fully pointed out hereafter, it is possible by using such a combination of material balances to obtain an acceptable determination of oxygen removal from the ore in the reduction zone without making any measurement of the change in the amount of water vapor in the gas.

Figure 2:
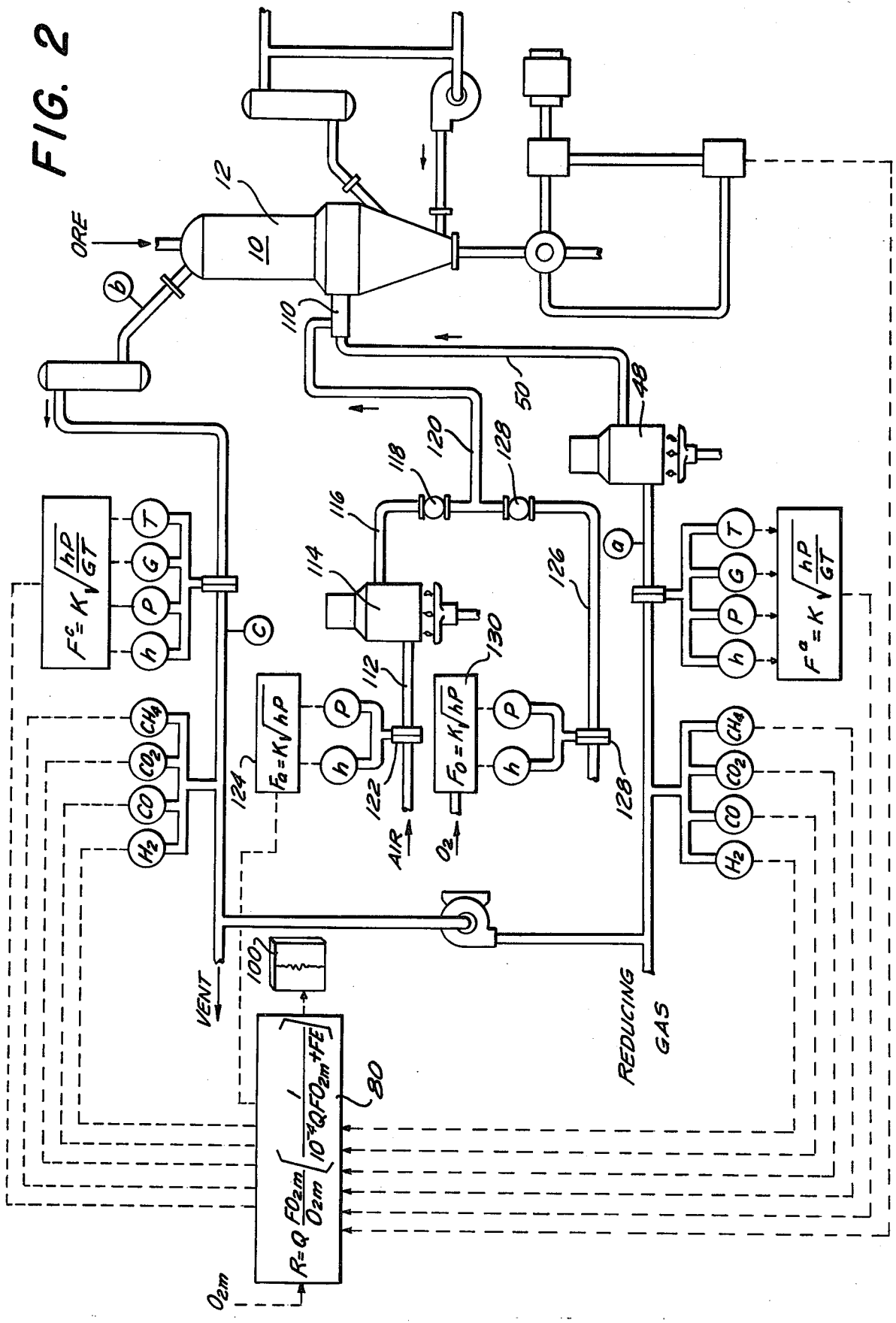

The objects and advantages of the invention can best be understood and appreciated by reference to the accompanying drawings which illustrate diagrammatically two preferred embodiments of the apparatus of the invention capable of carrying out the method of the invention and wherein:

FIG. 1 illustrates a vertical shaft moving bed gaseous iron ore reduction system incorporating apparatus for measuring the percentage reduction attained by the iron ore in passing through the reducing zone of the reactor, and FIG. 2 illustrates a reduction system similar to that of FIG. 1 but wherein air or oxygen is mixed with the hot reducing gas just before it enters the reduction zone of the reactor.

In general, it has been found that by measuring the percentage reduction of the sponge iron at the outlet of the reducing zone and maintaining it constant at a predetermined value, a sponge iron product having a substantially constant percentage reduction can be obtained.

Referring to the drawings and particularly to FIG. 1, the numeral 10 designates a conventional vertical shaft reactor comprising a reduction zone 12 and cooling zone 14. Ore is charged to the reactor 10 through a pipe 16 at the top of the reactor and leaves the bottom of the reactor through a pipe 18 provided with a rotary discharge valve 20. The valve 20 is rotated by an electric motor 22 through a speed changer 24. The rpm of the rotary valve 20 is sensed by an rpm sensor 26 which generates a signal that is transmitted to a controller 28. The controller 28 in turn generates a signal that is transmitted to the speed change 24 to so regulate the speed changer as to cause the valve 20 to rotate at a constant speed. The speed of rotation of the valve can be varied as desired by either manual or automatic adjustment of the set point of the controller 28.

Referring to the left central portion of FIG. 1, reducing gas for reducing the ore to sponge iron is generated in a reformer. Natural gas is supplied to the stack portion 32 of reformer 30 through a pipe 34 and flows through a pre-heating coil within the stack, thence through an external pipe 36 to the body of the reformer 30. Steam is fed through a pipe 38 to the pipe 36 and mixes with the natural gas therein. The mixture of natural gas and steam flows through catalyst tubes in the reformer 30 in known manner and is catalytically converted into carbon monoxide and hydrogen.

The reformed gas leaves the reformer through a pipe 40 and flows to the quench cooler 42 wherein it is cooled and de-watered. The cooled reformed gas flows through pipes 44 and 46 to a heater 48 wherein it is heated to a temperature of say 800° to 1100° C. The heated reducing gas then flows through pipe 50 and enters the reactor near the bottom of the reduction zone 12 wherein it flows upwardly in contact with the downwardly moving ore and largely reduces the ore to sponge iron.

The spent reducing gas leaves the reactor 10 at the top of the reducing zone 12 through pipe 52 and flows to and through quench cooler 54 wherein it is cooled and de-watered. Effluent gas from the cooler 54 flows through pipe 56 to the suction side of a pump 58, the discharge side of which is connected to pipe 46 in such manner that the cooled reducing gas is recycled to the reactor to form a closed loop. A certain amount of the effluent gas from cooler 54 is removed from the loop through a pipe 60 and is used as a fuel gas or flows to a suitable point of storage.

In the lower part of the reactor 10 there is a cooling zone 14 in which the reduced sponge iron is cooled by passage of a cooling gas therethrough. The cooling gas may or may not be a reducing gas and as in the case of the reduction zone, the gas flowing through the cooling zone is recycled in a closed loop. More particularly, cooling gas is pumped by a pump 62 through a pipe 64 to the bottom of cooling zone 14 and flows upwardly through the bed of sponge iron therein to cool it. From the top of the cooling zone 14 the cooling gas leaves the reactor through a pipe 66 and flows to and through a quench cooler 68 wherein it is cooled and de-watered. From cooler 68 the gas is returned through pipe 70 to the suction side of the pump 62 and thus recycled in a loop through the cooling zone. Fresh gas is introduced into the cooling gas loop from a pipe 72 and gas is continuously removed from the cooling loop through a pipe 74.

In the system shown in the drawing the percentage reduction of the ore at the bottom of the reduction zone is effectively measured and recorded and this measurement is used by the operator to effect a manual adjustment of the controller 28 to so control the speed of the rotary sponge iron discharge valve 20 as to maintain the percentage reduction constant at a desired value. While it is true that a certain amount of reduction may take place as the sponge iron passes through the cooling zone 14, it has been found that by controlling the percentage reduction at the bottom of the reducing zone a substantially steady state condition can be maintained overall to cause the product sponge iron to have a predetermined substantially constant percentage reduction.

In describing the apparatus used to determine percentage reduction, reference will be made to the gas composition at three locations designated as "a," "b" and "c" in the drawing. Location "a" is the pipe 46 between its junction with pipe 44 and the heater 48, location "b" is pipe 52 between reactor 10 and cooler 54, and location "c" is pipe 56 between cooler 54 and pump 58. At location "a" there is an orifice 76 forming part of an orifice meter 78. The differential pressure across the orifice 76 and the pressure, temperature and specific gravity of the gas flowing through pipe 46 are measured and correlated in meter 78 to produce a signal proportional to the gas flow rate at location "a", which signal is transmitted to a computer 80. As indicated in the drawing, the flow is determined by correlating the differential pressure with the pressure, temperature and specific gravity of the gas in accordance with the standard flow formula $F = K\sqrt{hP/GT}$ wherein:

$h$ = differential pressure head across orifice
$P$ = static absolute pressure at the orifice
$G$ = specific gravity of gas relative to air
$T$ = absolute temperature of gas at orifice
$K$ = orifice constant corrected to give dry gas flow rate
$F$ = molar flow rate Also the dry gas composition at location "a" is determined by a series of analytical devices 82 through 88. More particularly, the hydrogen content of the gas is determined on a dry basis in analytical device 82, the carbon monoxide content in device 84, the carbon dioxide content in device 86 and the methane content in device 88. Each of the analytical devices produces a signal which is a function of the proportion of the particular component in the gas stream at location "a" on a dry basis and this signal is transmitted to the computer 80. It may be noted that pipe 50 may also be considered as location "a" and the flow and composition of the gas leaving heater 48 measured.

The gas composition and dry gas flow rate at location "c" are measured in a similar fashion. More particularly, an orifice 90 is provided in pipe 56 and cooperates with an orifice meter 92 responsive to the differential across the orifice, as well as to the pressure, temperature and specific gravity of the gas to generate a signal which is a function of the dry gas flow rate and which is transmitted to the computer 80. Gas analysis devices 92 to 98 are provided to determine, respectively, the hydrogen, carbon monoxide, carbon dioxide and methane content of the gas at location "c" on a dry basis and to produce corresponding signals that are transmitted to the computer 80.

Within the computer 80 the signals representing the flow and composition of the gas at location "a" and the gas at location "c" are correlated with the reducible oxygen content of the ore and the rate of discharge of sponge iron from the reactor to generate a signal representative of the percentage reduction of the ore and this signal is transmitted to a recorder 100. The record thus made can be used by the operator as a basis for adjusting the set point of controller 28 to maintain the percentage reduction of the product sponge iron at a substantially constant desired value. While the gas flow rates and compositions at locations "a" and "c" can be correlated with the reducible oxygen content of the ore and the sponge iron production rate in various ways to determine percentage reduction, a preferred method of correlating these measurements will now be described.

In the following discussion the symbols listed below have the indicated meanings:

$F^a$ = total dry molar flow at location "a"
$F^a_{H_2}$ = hydrogen molar flow at location "a"
$F^a_{CH_4}$ = methane molar flow at location "a"
$F^a_{CO}$ = carbon monoxide molar flow at location "a"
$F^a_{CO_2}$ = carbon dioxide molar flow at location "a"
$F^a_{H_2O}$ = water vapor molar flow at location "a"
$F^b$ = total dry molar flow at location "b"
$F^b_{H_2}$ = hydrogen molar flow at location "b"
$F^b_{CH_4}$ = methane molar flow at location "b"
$F^b_{CO}$ = carbon monoxide molar flow at location "b"
$F^b_{CO_2}$ = carbon dioxide molar flow at location "b"
$F^b_{H_2O}$ = water vapor molar flow at location "b"
$F^c$ = total dry molar flow at location "c"
$F^c_{H_2}$ = hydrogen molar flow at location "c"
$F^c_{CH_4}$ = methane molar flow at location "c"
$F^c_{CO}$ = carbon monoxide molar flow at location "c"
$F^c_{CO_2}$ = carbon dioxide molar flow at location "c"
$F^c_{H_2O}$ = water vapor molar flow at location "c"
Fw = water removed in cooler 54, molar flow
$F_{O_2}$ = molar flow of oxygen
$F_a$ = molar flow of air
$FO_{2m}$ = rate of oxygen removal from ore (lb.-mols/hr.)
$O_{2m}$ = wt. % reducible oxygen in the ore
Fm = rate of charge of ore to reactor (weight/time)
Fmd = rate of charge of ore on a dry basis (weight/time)
$h_m$ = wt. humidity fraction of the ore
FE = rate of delivery of sponge iron (weight/time)
Q = a constant the value of which depends upon the units used for the variables involved
R = % reduction of iron ore By an elemental H$_2$ balance between locations "a" and "b" one obtains, assuming that the ore humidity is evaporated:

$$\frac{h_m F_m}{18} + F^a_{H_2} + 2F^a_{CH_4} + F^a_{H_2O} = F^b_{H_2} + 2F^b_{CH_4} + F^b_{H_2O} \quad (1)$$

Between locations "b" and "c" one obtains:

$$F^b_{H_2} + 2F^b_{CH_4} + F^b_{H_2O} = F^c_{H_2} + 2F^c_{CH_4} + F^c_{H_2O} + F_w \quad (2)$$

$$\text{Also } F^b_{H_2} = F^c_{H_2} \quad (3)$$

$$F^b_{CH_4} = F^c_{CH_4} \text{ and} \quad (4)$$

$$F^b_{H_2O} = F^c_{H_2O} + F_w \quad (5)$$

Combining equations (1) and (2)

$$\frac{h_m F_m}{18} + F^a_{H_2} + 2F^a_{CH_4} + F^a_{H_2O} = \quad (6)$$
$$F^c_{H_2} + 2F^c_{CH_4} + F^c_{H_2O} + F_w \text{ or}$$

$$F_w = (F^a_{H_2} - F^c_{H_2}) + 2(F^a_{CH_4} - F^c_{CH_4}) + (F^a_{H_2O} - F^c_{H_2O}) + \frac{h_m F_m}{18}$$

An elemental O balance between locations "a" and "c" gives $$\frac{h_m F_m}{18} + F^a_{CO} + 2F^a_{CO_2} F^a_{H_2O} + 2FO_{2m} = \quad (7)$$
$$F^c_{CO} + 2F^c_{CO_2} + F^c_{H_2O} + F_w$$

Substitution of equation (6) in equation (7) and rearrangement gives $$FO_{2m} = \tfrac{1}{2}\Big[(F^a_{H_2} - F^c_{H_2}) + 2(F^a_{CH_4} - F^c_{CH_4}) + \quad (8)$$
$$(F^a_{H_2O} - F^c_{H_2O}) + \frac{h_m F_m}{18} - (F^a_{CO} - F^c_{CO}) -$$
$$2(F^a_{CO_2} - F^c_{CO_2}) - (F^a_{H_2O} - F^c_{H_2O}) - \frac{h_m F_m}{18}\Big]$$

It will be noted that the two terms ($F^a_{H_2O} - F^c_{H_2O}$) and the two terms $h_m F_m/18$ cancel each other out giving:

$$FO_{2m} = \tfrac{1}{2}[(F^a_{H_2} - F^c_{H_2}) + 2(F^a_{CH_4} - F^c_{CH_4}) - \quad (9)$$
$$(F^a_{CO} - F^c_{CO}) - 2(F^a_{CO_2} - F^c_{CO_2})]$$

This equation can also be written:

$$FO_{2m} = \tfrac{1}{2}(\Delta F_{H_2} + 2\Delta F_{CH_4} - \Delta F_{CO} - 2\Delta F_{CO_2}) \quad (10)$$

It will be noted that equation (9) permits evaluation of the rate of oxygen removal from the ore in terms of only the gas flow and composition at locations "a" and "c"; it is found that no measurement of the water vapor content of the gas is required. Also it is not necessary to measure the moisture content of the ore, which is a significant advantage.

As indicated in the drawing, the total dry gas flow at locations "a" and "c" is measured by the orifice meters 78 and 92, respectively. Since the gas at location "a" has been de-watered in coolers 42 and 54 and the gas at location "c" has been de-watered in cooler 54, it is found that:

$$F^a = F^a_{H_2} + F^a_{CH_4} + F^a_{CO} + F^a_{CO_2} \quad (11)$$

and $$F^c = F^c_{H_2} + F^c_{CH_4} + F^c_{CO} + F^c_{CO_2} \quad (12)$$

It is evident that $F^a_{H_2}$ equals $F^a$ multiplied by the percentage measured by gas analysis device 82, $F^a_{CO}$ equals $F^a$ multiplied by the percentage measured by gas analysis device 84 and so on. The computations necessary to evaluate formula (9) are performed in computer 80.

The rate of introduction of oxygen into the reactor depends upon the ore charging rate Fm, the percentage of oxygen in the ore $O_{2m}$ and the humidity fraction $h_m$ and may be expressed as follows, assuming that Fm is expressed in metric tons per hour:

$$Fm \times 2200 \text{ (lbs./metric ton)} \frac{O_{2m}}{100} \times \quad (13)$$
$$\frac{1}{32} \text{ (mol. wt. of } O_2) \times (1 - h_m) =$$
$$\frac{2200}{3200} (Fm)(O_{2m})(1 - h_m)$$

The percent reduction R is equal to the rate of removal of oxygen ($FO_{2m}$) divided by the rate of introduction of oxygen in the charged ore as expressed by formula (13) times 100. Thus $$R = \frac{3200}{2200} \frac{FO_{2m}}{Fm(O_{2m})(1-h_m)} \times 100 = \quad (14)$$
$$145.45\left[\frac{FO_{2m}}{Fm(O_{2m})(1-h_m)}\right]$$

If Q is defined as 145.45, then $$R = Q\left[\frac{FO_{2m}}{Fm(O_{2m})(1-h_m)}\right] \quad (15)$$

The ore charging rate on a dry basis is:

$$Fmd = Fm(1-h_m) \quad (16)$$

Substituting (16) in (15) gives:

$$R = Q\frac{FO_{2m}}{Fmd(O_{2m})} \quad (17)$$

The sponge iron production rate FE is equal to the rate at which dry ore is charged to the reactor minus the rate at which oxygen is removed from the ore as follows:

$$FE = Fmd\left(1 - \frac{O_{2m}}{100} \times \frac{R}{100}\right) \quad (18)$$

or rearranging:

$$Fmd = \frac{FE}{1 - \frac{O_{2m}R}{10^4}} \quad (19)$$

Substituting (19) in (17) gives $$R = Q\frac{FO_{2m}}{(O_{2m})FE}\left[1 - \frac{(O_{2m})R}{10^4}\right] \quad (20)$$

Solving for R gives $$R = Q \frac{FO_{2m}}{O_{2m}} \left[ \frac{1}{10^{-4} Q FO_{2m} + FE} \right] \quad (21)$$

By substituting in equation (21) the value of $FO_{2m}$ given in equation (9) an expression is obtained for the percentage reduction of the ore in terms of the flow and compositions of the gas at locations "$a$" and "$c$", the percent of oxygen in the entering ore, which is a constant for any given ore, and the rate at which sponge iron is removed from the reactor. The computer 80 can be programmed to correlate the measured values of the variables in accordance with equations (9) and (21) to provide a signal indicating the percentage reduction of the ore. As disclosed above, this signal is transmitted to recorder 100 to record the values of the percentage reduction.

Turning now to FIG. 2 of the drawings, as indicated above, the reduction system of FIG. 2 is the same as that of FIG. 1, except that it provides for admixture of air or oxygen with the reducing gas just before it enters the reactor. In some cases the temperature of the gas leaving heater 48 may not be as high as is desirable and in such cases a combustion zone can be provided adjacent to the reactor and a small amount of air or oxygen mixed with the heated reducing gas in the combustion chamber to cause a portion of the reducing gas to be burned and thereby increase the temperature of the mixture to the desired reducing temperature. More particularly, in accordance with the system of FIG. 2, reducing gas from the heater 48 flows through the pipe 50 to a combustion chamber 110 which communicates with the bottom of reduction zone 12 of shaft reactor 10. The combustion chamber may be of the type disclosed in U.S. Pat. No. 2,900,247.

Air enters the system through a pipe 112 and flows to and through a heater 114 where it is heated to a temperature of say 500° to 900° C., thence through a branch pipe 116 containing valve 118 and through pipe 120 to the combustion chamber 110. Within pipe 112 the flow of air is measured by an orifice 122 and an associated flowmeter 124. The differential pressure "$h$" across the orifice and absolute pressure "$P$" are measured and correlated in meter 124 to give a signal which is a function of the airflow Fa and this signal is transmitted to the computer 80. Within chamber 110 the heated air and heated reducing gas are mixed to burn part of the reducing gas to raise the temperature of the mixture in known manner.

If oxygen is to be used instead of air, the oxygen enters the system through a pipe 126 containing valve 128 and flows through pipe 120 to the combustion chamber 110. The pipe 126 contains an orifice 128 and associated flowmeter 130. The pressure drop "$h$" across the orifice 128 and the absolute pressure of oxygen "$P$" in pipe 126 are measured and correlated in meter 130 to produce a signal which is a function of the oxygen flow $F_{O_2}$ and this signal is transmitted to the computer 80. It has been found that when oxygen is used, it is unnecessary that the oxygen be preheated before being mixed with the reducing gas. Also since the air and oxygen have a known fixed composition, no analytical determinations are required in respect to the air or oxygen, nor is it necessary to measure the specific gravity and temperature of these gases since these factors have essentially fixed values.

It is evident that when oxygen or air is added to the combustion chamber 110 the foregoing equations require a certain amount of modification. Considering first the case where oxygen is added to the reducing gas, the equations of the hydrogen balance (1) through (6) do not change but the input side of equation (7) changes by the term $2F_{O_2}$ as follows:

$$\frac{hm\,Fm}{18} + F^a_{CO} + 2F^a_{CO_2} + F^a_{H_2O} + 2FO_{2m} + 2F_{O_2} = \quad (22)$$
$$F^c_{CO} + 2F^c_{CO_2} + F^c_{H_2O} + Fw$$

Substituting equation (6) in equation (22), cancelling off-setting duplicate terms and rearranging gives:

$$FO_{2m} = \tfrac{1}{2} [(F^a_{H_2} - F^c_{H_2}) + 2(F^a_{CH_4} - F^c_{CH_4}) - \quad (23)$$
$$(F^a_{CO} - F^c_{CO}) - 2(F^a_{CO_2} - F^c_{CO_2}) - 2F_{O_2}]$$

This expression for $FO_{2m}$ can be substituted in equation (21) to give the percentage reduction R for the case where oxygen is added to the feed reducing gas.

In cases where air is added to the reducing gas in the combustion chamber the last term of equation (23) becomes 0.42 $F_a$, i.e. the number of moles of atomic oxygen per mol of air. This gives:

$$FO_{2m} = \tfrac{1}{2} [(F^a_{H_2} - F^c_{H_2}) + 2(F^a_{CH_4} - F^c_{CH_4}) - \quad (24)$$
$$(F^a_{CO} - F^c_{CO}) - 2(F^a_{CO_2} - F^c_{CO_2}) - 0.42\,F_a]$$

for the case where air is added to the combustion chamber. It is evident that the nitrogen introduced into the system in the air need not be included in the foregoing equations since the amount of nitrogen does not change as it passes through the reactor.

Computer 80 is programmed to correlate the various flows and compositions as set forth in equations (21) and (23) or (21) and (24) to produce a signal representative of percentage reduction "R" for transmission to recorder 100.

While the present method has been described in terms of measurement of the percentage reduction of the ore and manual adjustment of the rate of discharge of the sponge iron, it will be apparent to one skilled in the art that the method can also be advantageously used for automatic control of the percentage reduction. The signal transmitted by computer 80 to recorder 100 has a magnitude that is a function of percentage reduction. It is evident that this signal can be used in known manner to regulate automatically the set point of controller 28 and thereby vary the rotational speed of valve 20 to maintain the percentage reduction at a desired value.

While the measurement aspect of the present invention has been described above in relatively precise mathematical terms, it should be noted that it can also be defined verbally in a number of different ways. Thus in one of its broader aspects the method comprises measurement of the flow and composition of the reducing gas at a first location before being fed to the reactor, measurement of the flow and composition of the reducing gas at a second location between the point at which effluent gas from the reactor is cooled and the point at which reducing gas is vented from the loop and correlating the flow and composition measurements at the two locations with the rate at which sponge iron is delivered by the reactor to determine the percentage reduction of the ore.

In a somewhat narrower aspect the present method comprises measurement of gas flow and composition at the two locations specified above, determination of the difference between (a) the sum of the change in molar flow of hydrogen and twice the change in molar flow of methane between the two locations and (b) the sum of the change in molar flow of carbon monoxide and twice the change in molar flow of carbon dioxide between the two locations and correlation of said difference with the rate of sponge iron production to obtain a value indicative of percentage reduction.

The embodiment of the present invention wherein oxygen is added to the reducing gas before it enters the reactor comprises the steps of measuring the gas flow and composition between the two locations mentioned above, measuring the flow of oxygen added to the reducing gas, determining the difference between (a) the sum of the change in molar flow of hydrogen and twice the change in molar flow of methane between the two locations and (b) the sum of the change in molar flow of carbon monoxide and twice the change in molar flow of carbon dioxide between the two locations, deducting from said difference twice the molar flow of oxygen to said reducing gas and correlating the resulting value with the rate of sponge iron production to obtain a value indicative of percentage reduction.

The embodiment of the invention wherein air is added to the reducing gas before it enters the reactor comprises the steps of measuring the gas flow and composition between the two locations mentioned above, measuring the flow of air added to the reducing gas, determining the difference between (a) the sum of the change in molar flow of hydrogen and twice the change in molar flow of methane between the two locations, and (b) the sum of the change in molar flow of carbon monoxide and twice the change in molar flow of carbon dioxide between the two locations, deducting from said difference 0.42 of the molar flow of air to the reducing gas and correlating the resulting value with the rate of sponge iron production to obtain a value indicative of percentage reduction.

It is, of course, to be understood that the foregoing description is intended to be illustrative only and that numerous changes can be made in the procedures and apparatus described without departing from the spirit of the invention as set forth in the appended claims. Thus if the inlet or outlet reducing gas contains a hydrogen carrier other than hydrogen, methane or water, the hydrogen balance equations should be suitably modified to take this factor into account using a procedure analogous to that described. Similarly, if these gases contain an oxygen carrier other than carbon monoxide, water or carbon dioxide, the oxygen balance should be modified in a manner analogous to that disclosed above to take this factor into account. As pointed out above, if the gas fed to the reactor contains nitrogen, no term representing nitrogen flow need be included in the equations since nitrogen is inert under the reduction reaction conditions.

It is evident that equation (21) can be rearranged in various ways without altering its essential character. Also in cases where approximate results are acceptable, truncated versions of the equations can be used.

The gas flows may be measured by flowmeters other than the orifice type of flowmeter shown and signals representing the differential head, pressure, specific gravity and temperature of the gas can be transmitted directly to the main computer 80 rather than first passing through the meters 78 and 92. The reducing gas and cooling gas used may be of any type known to be useful in the reduction of iron ore to sponge iron and the subsequent cooling of the sponge iron. Other modifications within the scope of the invention will be apparent to those skilled in the art.

We claim:

1. A process for producing sponge metal by the gaseous reduction of oxidic metal ore in a vertical moving bed reactor, said process comprising the steps of charging ore to the reactor, feeding a reducing gas comprising carbon monoxide, hydrogen, methane and carbon dioxide through the ore in said reactor, cooling the effluent gas from said reactor to remove water therefrom, and determining the extent to which reduction of said ore occurs in said reactor by
   (1) measuring the flow and composition of the reducing gas at a first location before said gas enters said reactor,
   (2) measuring the flow and composition of the effluent reducing gas from the reactor at a second location after the effluent gas has been cooled,
   (3) determining the difference between
      (a) the sum of the change in molar flow of hydrogen and twice the change in molar flow of methane between said two locations and
      (b) the sum of the change in molar flow of carbon monoxide and twice the change in molar flow of carbon dioxide between said two locations as a first value indicative of the rate of removal of oxygen from said ore.
   (4) measuring the rate at which sponge metal is processed through said reactor,
   (5) effectively determining from said processing rate a second value indicative of the rate at which reducible oxygen enters said reactor with said ore and
   (6) comparing said first and second values to obtain a third value indicative of the percentage reduction in said reactor.

2. A process for producing sponge metal by the gaseous reduction of oxidic metal ore in a vertical moving bed reactor, said process comprising the steps of charging ore to the reactor, feeding a reducing gas comprising carbon monoxide, hydrogen, methane and carbon dioxide through the ore in said reactor, cooling the effluent gas from said reactor to remove water therefrom, adding oxygen to said reducing gas before it enters said reactor, and determining the extent to which reduction of said ore occurs in said reactor by
   (1) measuring the flow and composition of the reducing gas at a first location before said oxygen is added thereto,
   (2) measuring the flow and composition of the effluent reducing gas from the reactor at a second location after the effluent gas has been cooled,
   (3) measuring the flow of oxygen added to the reducing gas,
   (4) determining the difference between
      (a) the sum of the change in molar flow of hydrogen and twice the change in molar flow of methane between said two locations and
      (b) the sum of the change in molar flow of carbon monoxide and twice the change in molar flow of carbon dioxide between said two locations and deducting from said difference twice the molar flow of oxygen to said reducing gas to obtain a first value indicative of the rate of removal of oxygen from said ore, (5) measuring the rate at which sponge metal is processed through said reactor, (6) effectively determining from said processing rate a second value indicative of the rate at which reducible oxygen enters said reactor with said ore and (7) comparing said first and second values to obtain a third value indicative of the percentage reduction in said reactor.

3. A process for producing sponge metal by the gaseous reduction of oxidic metal ore in a vertical moving bed reactor, said process comprising the steps of charging ore to the reactor, feeding a reducing gas comprising carbon monoxide, hydrogen, methane and carbon dioxide through the ore in said reactor, cooling the effluent gas from said reactor to remove water therefrom, adding air to said reducing gas before it enters said reactor, and determining the extent to which reduction of said ore occurs in said reactor by (1) measuring the flow and composition of the reducing gas at a first location before said air is added thereto, (2) measuring the flow and composition of the effluent reducing gas from the reactor at a second location after the effluent gas has been cooled, (3) measuring the flow of air added to the reducing gas, (4) determining the difference between
 (a) the sum of the change in molar flow of hydrogen and twice the change in molar flow of methane between said two locations and
 (b) the sum of the change in molar flow of carbon monoxide and twice the change in molar flow of carbon dioxide between said two locations and deducting from said difference 0.42 of the molar flow of air to the reducing gas to obtain a first value indicative of the rate of removal of oxygen from said ore, (5) measuring the rate at which sponge metal is processed through said reactor, (6) effectively determining from said processing rate a second value indicative of the rate at which reducible oxygen enters said reactor with said ore and (7) comparing said first and second values to obtain a third value indicative of the percentage reduction in said reactor.

4. A process for producing sponge metal by the gaseous reduction of oxidic metal ore in a vertical moving bed reactor, said process comprising the steps of charging ore to the reactor, feeding a reducing gas comprising carbon monoxide, hydrogen, methane and carbon dioxide through the ore in said reactor, cooling the effluent gas from said reactor to remove water therefrom, and regulating the extent to which reduction of sponge metal occurs in said reactor by (1) measuring the flow and composition of the reducing gas at a first location before said gas enters said reactor, (2) measuring the flow and composition of the effluent reducing gas from the reactor at a second location after the effluent gas has been cooled, (3) determining the difference between
 (a) the sum of the change in molar flow of hydrogen and twice the change in molar flow of methane between said two locations and
 (b) the sum of the change in molar flow of carbon monoxide and twice the change in molar flow of carbon dioxide between said two locations as a first value indicative of the rate of removal of oxygen from said ore, (4) measuring the rate at which sponge metal is processed through said reactor, (5) effectively determining from said processing rate a second value indicative of the rate at which reducible oxygen enters said reactor with said ore, (6) comparing said first and second values to obtain a third value indicative of the percentage reduction in said reactor and (7) regulating the removal of sponge metal from said reactor in response to said third value to maintain the percentage reduction of the sponge metal leaving said reactor at a predetermined desired value.

5. A process for producing sponge iron by the gaseous reduction of iron ore in a vertical moving bed reactor, said process comprising the steps of charging ore to the reactor, feeding a reducing gas comprising carbon monoxide, hydrogen, methane and carbon dioxide through the ore in said reactor, cooling the effluent gas from said reactor to remove water therefrom, heating at least a portion of said effluent gas and returning it to said reactor to form a gas flow loop, venting cooled reducing gas from said loop, introducing fresh reducing gas into said loop at a point between said vent and the point at which the circulating gas is reheated, and regulating the extent to which reduction of said ore occurs in said reactor by (1) measuring the flow and composition of the reducing gas at a first location before said gas enters said reactor, (2) measuring the flow and composition of the effluent reducing gas from the reactor at a second location after the effluent gas has been cooled, (3) determining the difference between
 (a) the sum of the change in molar flow of hydrogen and twice the change in molar flow of methane between said two locations and
 (b) the sum of the change in molar flow of carbon monoxide and twice the change in molar flow of carbon dioxide between said two locations as a first value indicative of the rate of removal of oxygen from said ore, (4) measuring the rate at which sponge iron is processed through said reactor, (5) effectively determining from said processing rate a second value indicative of the rate at which reducible oxygen enters said reactor with said ore, (6) comparing said first and second values to obtain a third value indicative of the percentage reduction in said reactor, and (7) regulating the removal of sponge iron from said reactor in response to said third value to maintain the percentage reduction of sponge iron leaving said reactor at a predetermined desired value.

6. In a process for producing sponge iron by the gaseous reduction of iron ore in a vertical moving bed reactor, said process being of the type in which a hot reducing gas comprising carbon monoxide, hydrogen, methane and carbon dioxide is caused to flow through the ore in a reducing zone of said reactor, effluent gas from said reactor is cooled to remove water therefrom and then reheated and returned to said reactor to form a gas flow loop, cooled reducing gas is vented from said loop and fresh reducing gas is introduced into said loop at a point between said vent and the point at which the circulating gas is reheated, the method of regulating the extent to which reduction of iron ore occurs in said reactor which comprises measuring the flow and composition of the reducing gas in said loop at a first location between the point at which fresh gas is introduced and the point at which the circulating gas enters said reactor, measuring the flow and composition of the reducing gas at a second location between the point at which the circulating gas is cooled and the point at which it is vented and determining the percentage reduction of iron ore R by correlating said flow and composition measurements at said two locations in accordance with the following equation:

$$R = Q \frac{FO_{2m}}{O_{2m}} \left[ \frac{1}{0.0001 \, Q \, FO_{2m} + FE} \right]$$

wherein $$FO_{2m} = \tfrac{1}{2} [(F^a_{H_2} - F^c_{H_2}) + 2(F^a_{CH_4} - F^c_{CH_4}) - (F^a_{CO} - F^c_{CO}) - 2(F^a_{CO_2} - F^c_{CO_2})]$$

R = % reduction of the iron ore
FE = rate of sponge iron production
Q = a constant the value of which depends upon the units used for the variables of the formula
$O_{2m}$ = % reducible oxygen in the ore
$FO_{2m}$ = rate of oxygen removed from iron ore
$F^a_{H_2}$ = hydrogen flow at the first location
$F^a_{CH_4}$ = methane flow at the first location
$F^a_{CO}$ = carbon monoxide flow at the first location
$F^a_{CO_2}$ = carbon dioxide flow at the first location
$F^c_{H_2}$ = hydrogen flow at the second location
$F^c_{CH_4}$ = methane flow at the second location
$F^c_{CO}$ = carbon monoxide flow at the second location
$F^c_{CO_2}$ = carbon dioxide flow at the second location and regulating the rate of removal of sponge iron from said reactor in response to the thus determined percentage reduction to maintain the percentage reduction at a predetermined desired value.

7. In a process for producing sponge iron by the gaseous reduction of iron ore in a vertical moving bed reactor, said process being of the type in which a hot reducing gas comprising carbon monoxide, hydrogen, methane and carbon dioxide is caused to flow through the ore in a reducing zone of said reactor, effluent gas from said reactor is cooled to remove water therefrom and then reheated and returned to said reactor to form a gas flow loop, cooled reducing gas is vented from said loop and fresh reducing gas is introduced into said loop at a point between said vent and the point at which the circulating gas is reheated, the method of determining the extent to which reduction of iron ore occurs in said reactor which comprises measuring the flow and composition of the reducing gas in said loop at a first location between the point at which fresh gas is introduced and the point at which the circulating gas enters said reactor, measuring the flow and composition of the reducing gas at a second location between the point at which the circulating gas is cooled and the point at which it is vented and determining the percentage reduction of iron ore R by correlating said flow and composition measurements at said two locations in accordance with the following equation:

$$R = Q \frac{FO_{2m}}{O_{2m}} \left[ \frac{1}{0.0001 \, Q \, FO_{2m} + FE} \right]$$

wherein $$FO_{2m} = \tfrac{1}{2} [(F^a_{H_2} - F^c_{H_2}) + 2(F^a_{CH_4} - F^c_{CH_4}) - (F^a_{CO} - F^c_{CO}) - 2(F^a_{CO_2} - F^c_{CO_2})]$$

R = % reduction of the iron ore
FE = rate of sponge iron production
Q = a constant the value of which depends upon the units used for the variables of the formula
$O_{2m}$ = % reducible oxygen in the ore
$FO_{2m}$ = rate of oxygen removed from iron ore
$F^a_{H_2}$ = hydrogen flow at the first location
$F^a_{CH_4}$ = methane flow at the first location
$F^a_{CO}$ = carbon monoxide flow at the first location
$F^a_{CO_2}$ = carbon dioxide flow at the first location
$F^c_{H_2}$ = hydrogen flow at the second location
$F^c_{CH_4}$ = methane molar flow at the second location
$F^c_{CO}$ = carbon monoxide molar flow at the second location
$F^c_{CO_2}$ = carbon dioxide molar flow at the second location 8. In a process for producing sponge iron by the gaseous reduction of iron ore in a vertical moving bed reactor, said process being of the type in which a hot reducing gas comprising carbon monoxide, hydrogen, methane and carbon dioxide is caused to flow through the ore in a reducing zone of said reactor, effluent gas from said reactor is cooled to remove water therefrom and then reheated and returned to said reactor to form a gas flow loop, cooled reducing gas is vented from said loop, fresh reducing gas is introduced into said loop at a point between said vent and the point at which the circulating gas is reheated, and oxygen is added to said reducing gas loop between the point at which the reducing gas is reheated and the point at which the reducing gas enters said reactor, the method of determining the extent to which reduction of iron ore occurs in said reactor which comprises measuring the flow and composition of the reducing gas in said loop at a first location between the point at which fresh gas is introduced and the point at which oxygen is added to said loop, measuring the flow and composition of the reducing gas at a second location between the point at which the circulating gas is cooled and the point at which it is vented, measuring the flow of oxygen to said reducing gas and determining the percentage reduction of iron ore R by correlating said flow and composition measurements at said two locations and said oxygen flow measurement in accordance with the following equation:

$$R = Q \frac{FO_{2m}}{O_{2m}} \left[ \frac{1}{0.0001 \, Q \, FO_{2m} + FE} \right]$$

wherein $$FO_{2m} = \tfrac{1}{2} [(F^a_{H_2} - F^c_{H_2}) + 2(F^a_{CH_4} - F^c_{CH_4}) - (F^a_{CO} - F^c_{CO}) - 2(F^a_{CO_2} - F^c_{CO_2}) - 2F_{O_2}]$$

R = % reduction of the iron ore
FE = rate of sponge iron production
Q = a constant the value of which depends upon the units used for the variables of the formula
$O_{2m}$ = % reducible oxygen in the ore
$FO_{2m}$ = rate of oxygen removed from iron ore
$F^a_{H_2}$ = hydrogen flow at the first location
$F^a_{CH_4}$ = methane flow at the first location
$F^a_{CO}$ = carbon monoxide flow at the first location
$F^a_{CO_2}$ = carbon dioxide flow at the first location
$F^c_{H_2}$ = hydrogen flow at the second location
$F^c_{CH_4}$ = methane flow at the second location
$F^c_{CO}$ = carbon monoxide flow at the second location
$F^c_{CO_2}$ = carbon dioxide flow at the second location
$F_{O_2}$ = the molar flow of oxygen added to the reducing gas.

9. In a process for producing sponge iron by the gaseous reduction of iron ore in a vertical moving bed reactor, said process being of the type in which a hot reducing gas comprising carbon monoxide, hydrogen, methane and carbon dioxide is caused to flow through the ore in a reducing zone of said reactor, effluent gas from said reactor is cooled to remove water therefrom and then reheated and returned to said reactor to form a gas flow loop, cooled reducing gas is vented from said loop, fresh reducing gas is introduced into said loop at a point between said vent and the point at which the circulating gas is reheated, and air is added to said reducing gas loop between the point at which the reducing gas is reheated and the point at which the reducing gas enters said reactor, the method of determining the extent to which reduction of iron ore occurs in said reactor which comprises measuring the flow of air to said reducing gas, measuring the flow and composition of the reducing gas in said loop at a first location between the point at which fresh gas is introduced and the point at which air is added to said loop, measuring the flow and composition of the reducing gas at a second location between the point at which the circulating gas is cooled and the point at which it is vented and determining the percentage reduction of iron ore R by correlating said flow and composition measurements at said two locations and said air flow measurement in accordance with the following equation:

$$R = Q \frac{FO_{2m}}{O_{2m}} \left[ \frac{1}{0.0001 \, Q \, FO_{2m} + FE} \right]$$

wherein $$FO_{2m} = \tfrac{1}{2} [(F^a_{H_2} - F^c_{H_2}) + 2(F^a_{CH_4} - F^c_{CH_4}) - (F^a_{CO} - F^c_{CO}) - 2(F^a_{CO_2} - F^c_{CO_2}) - 0.42 \, F_a]$$

R = % reduction of the iron ore
FE = rate of sponge iron production
Q = a constant the value of which depends upon the units used for the variables of the formula
$O_{2m}$ = % reducible oxygen in the ore
$FO_{2m}$ = rate of oxygen removed iron ore
$F^a_{H_2}$ = hydrogen flow at the first location
$F^a_{CH_4}$ = methane flow at the first location
$F^a_{CO}$ = carbon monoxide flow at the first location
$F^a_{CO_2}$ = carbon dioxide flow at the first location
$F^c_{H_2}$ = hydrogen flow at the second location
$F^c_{CH_4}$ = methane flow at the second location
$F^c_{CO}$ = carbon monoxide flow at the second location
$F^c_{CO_2}$ = carbon dioxide flow at the second location
$F_a$ = the molar flow of air added to the circulating reducing gas.

* * * * *